US011976660B2

(12) United States Patent
Hollohan et al.

(10) Patent No.: US 11,976,660 B2
(45) Date of Patent: May 7, 2024

(54) INVERTED CLOSED BELLOWS WITH LUBRICATED GUIDE RING SUPPORT

(71) Applicant: Baker Hughes Oilfield Operations LLC, Houston, TX (US)

(72) Inventors: Cody Hollohan, Edmonton (CA); David Tanner, Broken Arrow, OK (US); Bryan Coates, Leduc (CA)

(73) Assignee: Baker Hughes Oilfield Operations LLC, Houston, TX (US)

( * ) Notice: Subject to any disclaimer, the term of this patent is extended or adjusted under 35 U.S.C. 154(b) by 873 days.

(21) Appl. No.: 17/015,072

(22) Filed: Sep. 8, 2020

(65) Prior Publication Data

US 2021/0071510 A1 Mar. 11, 2021

Related U.S. Application Data

(60) Provisional application No. 62/898,477, filed on Sep. 10, 2019.

(51) Int. Cl.
*E21B 43/12* (2006.01)
*F04B 17/03* (2006.01)
(Continued)

(52) U.S. Cl.
CPC .......... *F04D 13/062* (2013.01); *E21B 43/128* (2013.01); *F04B 17/03* (2013.01);
(Continued)

(58) Field of Classification Search
CPC .... F04D 13/062; F04D 13/083; E21B 43/128; F15B 1/103; F15B 7/10; F15B 15/18; F15B 2201/3153
(Continued)

(56) References Cited

U.S. PATENT DOCUMENTS 2,857,181 A 10/1958 Myers
3,475,634 A 10/1969 Bogdanov et al.
(Continued)

FOREIGN PATENT DOCUMENTS

AU 2004257928 B2 12/2008
CN 1080366 A 1/1994
(Continued)

OTHER PUBLICATIONS

Kurokawa et al., JP 2002242902 Mach. Trans.—("JP_2002242902_A_I_MT.pdf"), Aug. 2008 (Year: 2008).*
(Continued)

*Primary Examiner* — Kenneth J Hansen
(74) *Attorney, Agent, or Firm* — Crowe & Dunlevy, P.C.

(57) ABSTRACT

A pumping system deployed in a wellbore has a motor, a pump driven by the motor, and a volumetric compensator connected to the motor to accommodate the expansion and contraction of fluids contained within the motor. The volumetric compensator has a head connected to the motor, a base that includes a fluid exchange port that extends to the wellbore, and a housing extending between the head and the base. The volumetric compensator further includes an inverted bellows assembly contained within the housing. The inverted bellows assembly includes a metal bellows that has an interior, an exterior, a proximal end and a distal end. The interior of the metal bellows is in fluid communication with the wellbore. The inverted bellows assembly may also include one or more guide rings connected to the exterior of the metal bellows. The guide rings are lubricated by the clean motor fluid surrounding the exterior of the metal bellows.

16 Claims, 3 Drawing Sheets

(51) Int. Cl.

| | |
|---|---|
| ***F04D 13/06*** | (2006.01) |
| ***F04D 13/08*** | (2006.01) |
| ***F15B 7/10*** | (2006.01) |
| ***F15B 15/18*** | (2006.01) |

(52) U.S. Cl.
CPC .............. *F04D 13/086* (2013.01); *F15B 7/10* (2013.01); *F15B 15/18* (2013.01); *F15B 2201/3153* (2013.01)

(58) Field of Classification Search
USPC .................................................. 92/35, 42, 44
See application file for complete search history.

(56) References Cited

U.S. PATENT DOCUMENTS

| | | | | |
|---|---|---|---|---|
| 3,677,665 | A | 7/1972 | Corkill | |
| 3,947,709 | A | 3/1976 | Waltman | |
| 4,421,999 | A | 12/1983 | Beavers et al. | |
| 4,436,488 | A * | 3/1984 | Witten .................... | F04B 47/06 310/87 |
| 4,477,235 | A | 10/1984 | Gilmer et al. | |
| 4,576,404 | A | 3/1986 | Weber | |
| 4,583,923 | A | 4/1986 | James | |
| 4,940,911 | A | 7/1990 | Wilson | |
| 4,992,689 | A | 2/1991 | Bookout | |
| 5,011,166 | A | 4/1991 | Watts | |
| 5,087,846 | A | 2/1992 | Wright | |
| 5,367,214 | A | 11/1994 | Turner | |
| 5,554,897 | A | 9/1996 | Martin et al. | |
| 5,622,222 | A | 4/1997 | Wilson et al. | |
| 5,796,197 | A | 8/1998 | Bookout | |
| 6,100,616 | A | 8/2000 | Heinig et al. | |
| 6,242,829 | B1 | 6/2001 | Scarsdale | |
| 6,268,672 | B1 | 7/2001 | Straub et al. | |
| 6,666,664 | B2 | 12/2003 | Gross | |
| 6,851,935 | B2 | 2/2005 | Merrill et al. | |
| 6,863,124 | B2 | 3/2005 | Araux et al. | |
| 6,971,848 | B2 | 12/2005 | Watson | |
| 6,979,174 | B2 | 12/2005 | Watson et al. | |
| 6,981,853 | B2 | 1/2006 | Du et al. | |
| 7,066,248 | B2 | 6/2006 | Howell | |
| 7,326,034 | B2 | 2/2008 | Sheth et al. | |
| 7,370,697 | B1 | 5/2008 | Sakamoto et al. | |
| 7,530,391 | B2 | 5/2009 | Hall et al. | |
| 7,654,315 | B2 | 2/2010 | Du et al. | |
| 7,708,534 | B2 | 5/2010 | Parmeter et al. | |
| 7,741,744 | B2 | 6/2010 | Watson et al. | |
| 8,221,092 | B2 | 7/2012 | Chilcoat et al. | |
| 8,328,539 | B2 | 12/2012 | Watson et al. | |
| 8,430,649 | B2 | 4/2013 | Albers et al. | |
| 8,604,740 | B2 | 12/2013 | D'Amico et al. | |
| 8,651,837 | B2 * | 2/2014 | Tetzlaff ............... | F04D 13/0653 310/87 |
| 8,740,586 | B2 | 6/2014 | Martinez et al. | |
| 8,807,966 | B2 | 8/2014 | Du et al. | |
| 9,593,693 | B2 | 3/2017 | Howell et al. | |
| 9,777,560 | B2 | 10/2017 | Tetzlaff et al. | |
| 9,869,322 | B2 | 1/2018 | Tanner et al. | |
| 9,920,774 | B2 | 3/2018 | Ghasripoor et al. | |
| 9,995,118 | B2 | 6/2018 | Tanner et al. | |
| 10,094,206 | B2 | 10/2018 | Santos et al. | |
| 10,107,050 | B2 | 10/2018 | Williamson et al. | |
| 10,125,759 | B2 | 11/2018 | Pyron et al. | |
| 2007/0142547 | A1 | 6/2007 | Vaidya et al. | |
| 2011/0097223 | A1 | 4/2011 | Verichev et al. | |
| 2014/0154101 | A1 | 6/2014 | Gerrard et al. | |
| 2015/0337843 | A1 * | 11/2015 | Tanner ................ | F04D 15/0005 417/423.3 |
| 2017/0306733 | A1 | 10/2017 | Reeves et al. | |

FOREIGN PATENT DOCUMENTS

| | | | | |
|---|---|---|---|---|
| CN | 101860108 | A | 10/2010 | |
| CN | 201726224 | U | 1/2011 | |
| JP | 2002242902 | A * | 8/2002 | .............. F15B 1/103 |
| WO | 2012136258 | A1 | 10/2012 | |
| WO | 2014105400 | A2 | 7/2014 | |
| WO | 2015094250 | A1 | 6/2015 | |
| WO | 2015185325 | A1 | 12/2015 | |
| WO | 2016081335 | A1 | 5/2016 | |
| WO | WO-2016081335 | A1 * | 5/2016 | ............. E21B 4/003 |
| WO | 2018136651 | A1 | 7/2018 | |

OTHER PUBLICATIONS

ISA/KR; Search Report for PCT/US2020/049880; dated Dec. 9, 2020.

ISA/KR; Written Opinion for PCT/US2020/049880; dated Dec. 9, 2020.

* cited by examiner

INVERTED CLOSED BELLOWS WITH LUBRICATED GUIDE RING SUPPORT

RELATED APPLICATIONS

This application claims the benefit of U.S. Provisional Patent Application Ser. No. 62/898,477 filed Sep. 10, 2019 entitled, "Inverted Closed Bellows with Lubricated Guide Ring Support," the disclosure of which is herein incorporated by reference.

FIELD OF THE INVENTION

This invention relates generally to the field of submersible pumping systems, and more particularly, but not by way of limitation, to an improved volumetric compensator for use in a submersible pumping system.

BACKGROUND

Submersible pumping systems are often deployed into wells to recover petroleum fluids from subterranean reservoirs. Typically, the submersible pumping system includes a number of components, including one or more fluid filled electric motors coupled to one or more high performance pumps. Each of the components and sub-components in a submersible pumping system must be engineered to withstand the inhospitable downhole environment, which includes wide ranges of temperature, pressure and corrosive well fluids.

During installation and use, the motor undergoes repeated thermal cycles in which the temperature of the motor increases and decreases. As the motor temperature cycles, the lubricating fluid inside the motor expands and contracts. To prevent damage to seals within the motor from excessive pressure, it is important to provide a mechanism for accommodating the expansion of the motor lubricant. It is equally important to provide a mechanism that isolates the motor from contaminated wellbore fluids when the motor cools and the fluid lubricants contract. Pumping systems typically include fluid isolation systems designed to accommodate the volumetric changes of the motor lubricant, while isolating the clean motor lubricants from contaminated fluids from the wellbore.

In many pumping systems, "seal sections" are used to accommodate the expansion and contraction of motor lubricants while transmitting torque between the motor and pump. In other pumping systems, the fluid isolation mechanisms are incorporated within a dedicated volumetric compensator that is placed below the motor to accommodate the expansion and contraction of motor fluids without transferring torque from the motor to the pump. Many fluid isolation mechanisms employ seal bags to accommodate the volumetric changes and movement of fluid in the seal section. Seal bags can also be configured to provide a positive barrier between clean lubricant and contaminated wellbore fluid.

In other cases, bellows are used to accommodate the contraction and expansion of the internal fluid lubricants. The bellows are typically manufactured from a durable, flexible metal to mitigate water permeation under elevated temperatures. In the past, bellows seals have been configured such that the clean lubricant from the motor is directed into the interior of the bellows and wellbore fluid is contained in the variable space between the housing and the outside of the bellows. As the temperature of the lubricant fluid increases, the volumetric expansion of the fluid forces the bellows to expand, thereby displacing wellbore fluids in the housing. As the motor lubricant cools and contracts, the bellows contract and wellbore fluids are drawn into the housing. The bellows may expand and contract many times during the operation of the electric submersible pump.

Although generally effective at preventing wellbore fluid permeation at elevated temperatures, prior art metal bellows are expensive to manufacture and subject to mechanical failure following repeated flexing. In particular, the prolonged exposure to wellbore fluids and solid particles may increase friction at the interface between the metal bellows and the interior of the housing. Repeated rubbing may abrade the metal bellows, thereby compromising the isolating barrier between clean motor lubricant and contaminated wellbore fluids. There is, therefore, a need for an improved volumetric compensator that exhibits fluid impermeability under high temperatures while retaining the durability of conventional bag seals. It is to this and other needs that the present disclosure is directed.

SUMMARY OF THE INVENTION

In one aspect, the present invention provides a pumping system deployed in a wellbore has a motor, a pump driven by the motor, and a volumetric compensator connected to the motor to accommodate the expansion and contraction of fluids contained within the motor. The volumetric compensator has a head connected to the motor, a base that includes a fluid exchange port that extends to the wellbore, and a housing extending between the head and the base. The volumetric compensator further includes an inverted bellows assembly contained within the housing. The inverted bellows assembly includes a metal bellows that has an interior, an exterior, a proximal end and a distal end. The interior of the metal bellows is in fluid communication with the wellbore. The inverted bellows assembly may also include one or more guide rings connected to the exterior of the metal bellows. The guide rings are lubricated by the clean motor fluid surrounding the exterior of the metal bellows.

In another aspect, the present invention includes a pumping system deployed in a wellbore. The pumping system includes a motor, a pump driven by the motor, and a volumetric compensator connected to the motor such that the motor is positioned between the pump and the volumetric compensator. The volumetric compensator includes a head connected to the motor, a base that includes a fluid exchange port that extends to the wellbore, a housing extending between the head and the base, and an inverted bellows assembly contained within the housing. The inverted bellows assembly includes a metal bellows that has an interior, an exterior, a proximal end and a distal end. The interior of the metal bellows is in fluid communication with the wellbore.

In another aspect, the present invention includes an inverted bellows assembly configured for use in a pumping system deployed in a wellbore. The pumping system has a motor with motor lubricant and a pump driven by the motor to produce fluids from the wellbore. The inverted bellows assembly has a metal bellows with an interior and an exterior. The interior of the metal bellows is in fluid communication with the wellbore. The inverted bellows assembly also includes a guide ring connected to the exterior of the metal bellows, wherein the guide ring is in contact with the motor lubricant.

WRITTEN DESCRIPTION

Figure 1:
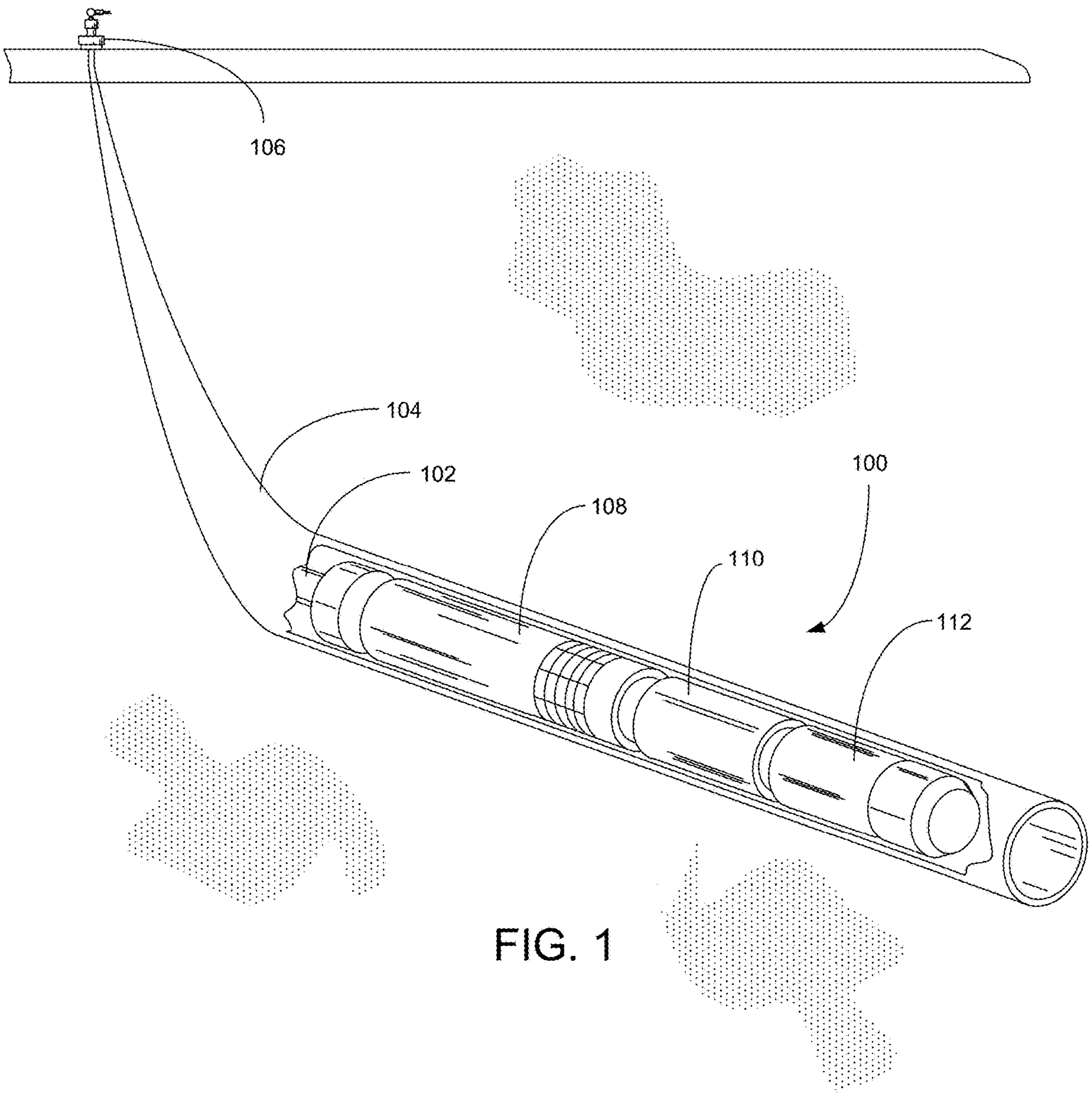
FIG. 1 is a front perspective view of a downhole pumping system in a non-vertical installation.

In accordance with an exemplary embodiment, FIG. 1 shows a front perspective view of a downhole pumping system 100 attached to production tubing 102. The downhole pumping system 100 and production tubing 102 are disposed in a wellbore 104, which is drilled for the production of a fluid such as water or petroleum. The downhole pumping system 100 is shown in a non-vertical well. This type of well is often referred to as a "deviated" or "horizontal" well. Although the downhole pumping system 100 is depicted in a horizontal well, it will be appreciated that the downhole pumping system 100 can also be used in vertical wells.

As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system 100 are primarily disclosed in a submersible application, some or all of these components can also be used in surface pumping operations. The pumping system 100 can also be deployed in offshore applications in which the surface is a production platform.

The pumping system 100 preferably includes some combination of a pump 108, a motor 110 and a volumetric compensator 112. In some embodiments, the motor 110 is an electrical motor that receives its power from a surface-based supply. The motor 110 converts the electrical energy into mechanical energy, which is transmitted to the pump 108 by one or more interconnected shafts. The pump 108 transfers a portion of this mechanical energy to fluids within the wellbore 104, causing the wellbore fluids to move through the production tubing 102 to the wellhead 106 on the surface. In some embodiments, the pump 108 is a turbomachine that uses one or more impellers and diffusers to convert mechanical energy into pressure head. In an alternative embodiment, the pump 108 is a progressive cavity (PC) or positive displacement pump that moves wellbore fluids with one or more screws or pistons.

The volumetric compensator 112 is configured to accommodate the expansion and contraction of motor lubricants or other fluids within the motor, while preventing the ingress of contaminants from the wellbore 104 into the motor 110. As used herein, the term "motor lubricant" refers to any liquid or fluid placed within the motor 110 during manufacture or repair. Although only one pump 108, volumetric compensator 112 and motor 110 are shown, it will be understood that the downhole pumping system 100 could include additional components, including pumps, seals sections, gas separators, volumetric compensators and motors.

Figure 2:
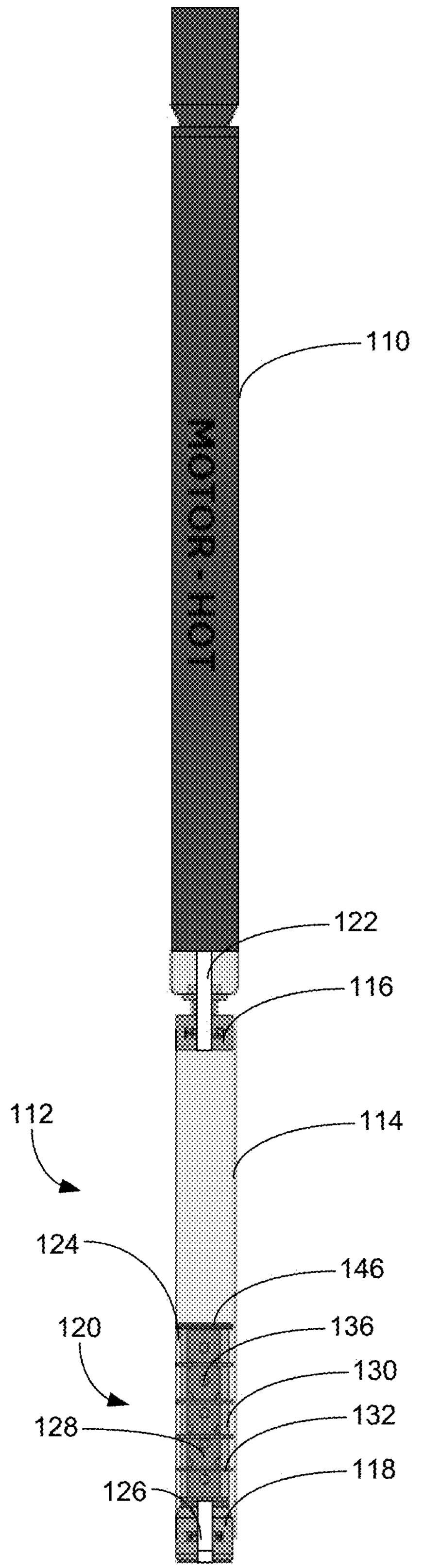
FIG. 2 is an elevational view of the motor and volumetric compensator with the motor in a hot condition and the bellows assembly contracted.
Figure 3:
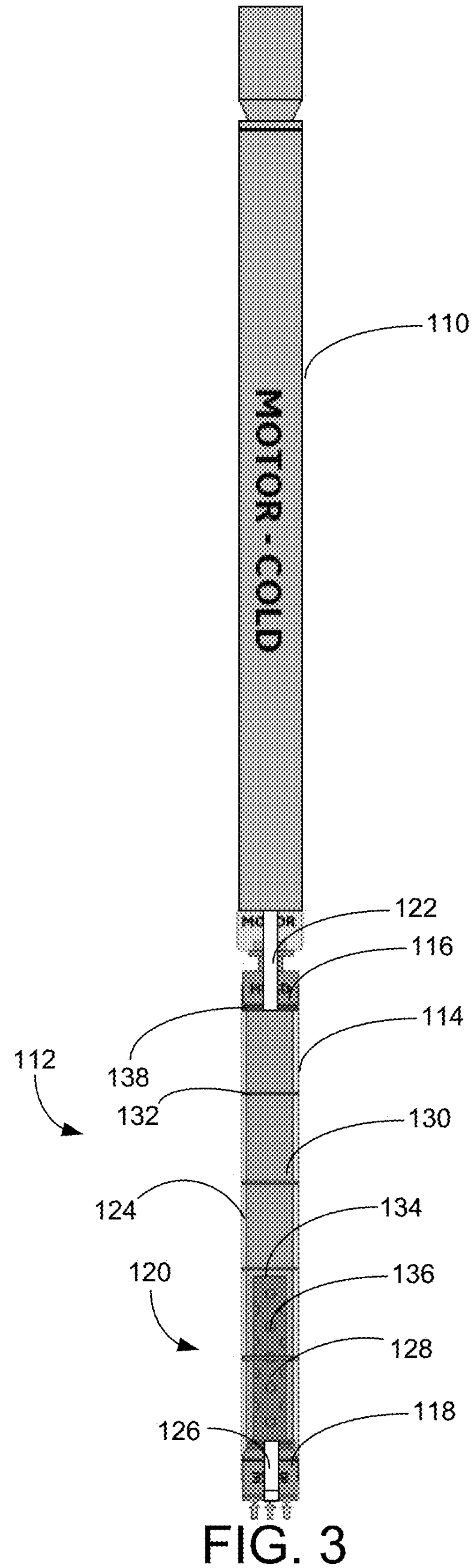
FIG. 3 is an elevational view of the motor and volumetric compensator with the motor in a cold condition and the bellows assembly extended.

Turning to FIGS. 2-3, shown therein are elevational views of the motor 110 and volumetric compensator 112. In the depicted embodiment, the volumetric compensator 112 is connected to the base of the motor 110. In this way, the motor 110 is located between the volumetric compensator 112 and the pump 108. The volumetric compensator 112 includes a housing 114, a head 116, a base 118 and an inverted bellows assembly 120. The housing 114 extends from the head 116 to the base 118 and encapsulates that inverted bellows assembly 120.

Figure 4:
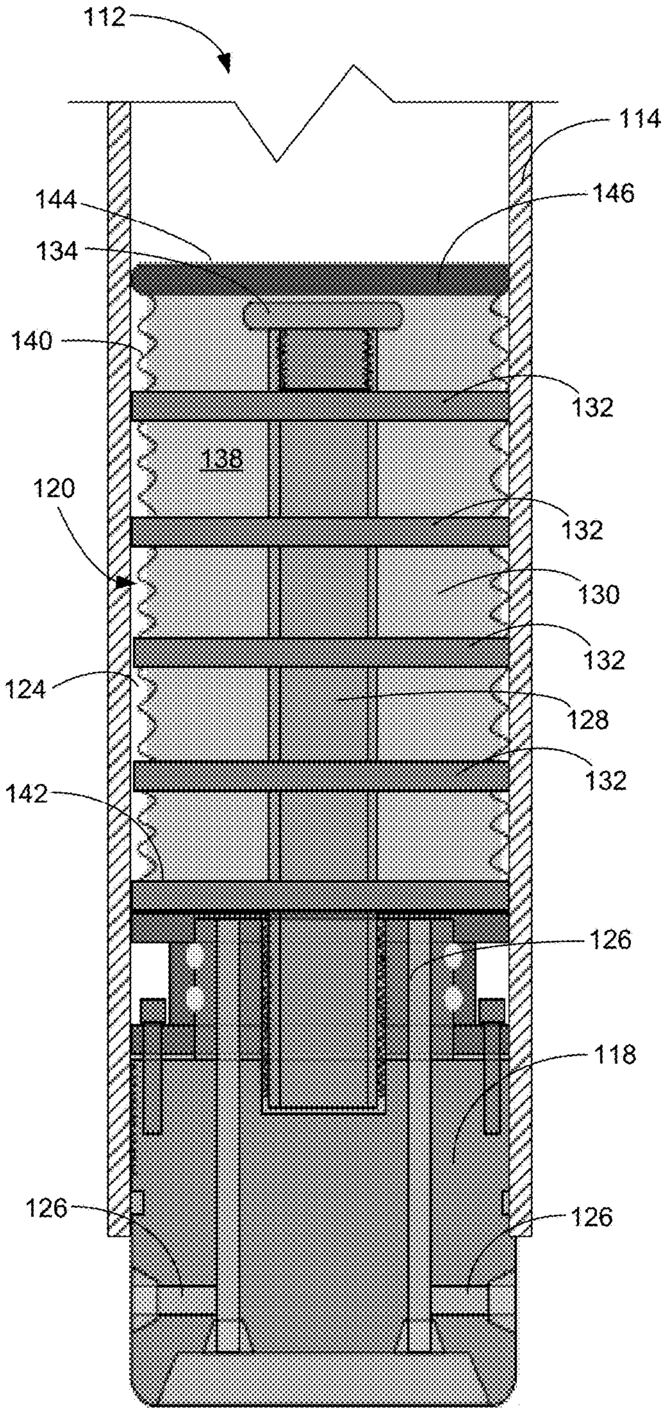
FIG. 4 is a close-up cross-sectional view of the volumetric compensator of FIG. 2.

The head 116 is connected to the motor 110 and includes an inlet port 122 that places the motor lubricant within the interior of the motor 110 in fluid communication with the interior of the housing 114 in an annular space 124 around the outside of the inverted bellows assembly 120. As best depicted in FIG. 4, the base 118 includes exchange ports 126 that permit the introduction and discharge of wellbore fluids into the base 118 and inverted bellows assembly 120. The exchange ports 126 may include filter plugs that reduce the introduction of solid particles into the volumetric compensator 112.

Continuing with FIGS. 2-4, the inverted bellows assembly 120 includes a standoff post 128, a corrugated metal bellows 130, and guide rings 132. A proximal end of the standoff post 128 is secured to the base 118 through a threaded or other connection. A distal end of the standoff post 128 includes a cap 134. In the embodiment depicted in FIGS. 2-3, the exchange ports 126 extend through the base 118 to the standoff post 128, which includes vents 136 to permit the movement of wellbore fluids between the interior of the metal bellows 130 and the interior of the standoff post 128. In contrast, in the embodiment depicted in FIG. 4, the exchange ports 126 bypass the interior of the standoff post 128 and extend directly to the interior of the metal bellows 130, such that the standoff post 128 is not used to communicate wellbore fluids into the metal bellows 130. It will be appreciated that the exchange ports 126 may be arranged in a variety of configurations to place the interior of the metal bellows 130 in fluid communication with the wellbore 104.

The metal bellows 130 includes an interior 138, an exterior 140, a proximal end 142, and a distal end 144. The proximal end 142 of the metal bellows 130 is secured to the base 118. The distal end 144 of the metal bellows 130 includes a top plate 146 and is free to linearly reciprocate within the housing 114 as the metal bellows 130 extends and collapses. The metal bellows 130, base 118 and top plate 146 cooperate to provide a sealed, variable volume chamber that surrounds the standoff post 128 and prevents the migration of wellbore fluids into the annular space 124 surrounding the inverted bellows assembly 120 within the housing 114.

The guide rings 132 are connected to the exterior 140 of the metal bellows 130 at various intervals. The guide rings 132 have an outside diameter that is larger than outside diameter of the convolutions of the metal bellows 130. The guide rings 132 are configured to provide a bearing interface with the interior of the housing 114 to facilitate the linear, reciprocating movement of the guide rings 132 and metal bellows 130 within the housing 114, while protecting the metal bellows 130 from direct contact with the housing 114. In other embodiments, the guide rings 132 are connected between adjacent sections of the metal bellows 130 rather than being connected to the exterior of a continuous section of the metal bellows 130.

Figure 5:
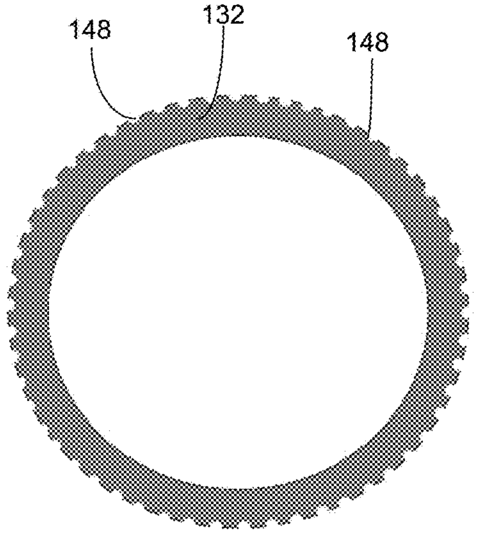
FIG. 5 is a top view of a guide ring constructed in accordance with a first embodiment.
Figure 6:
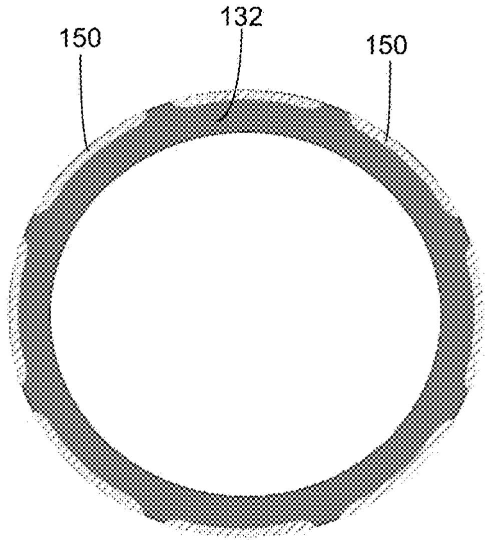
FIG. 6 is a top view of a guide ring constructed in accordance with a second embodiment.

As depicted in FIG. 5, in some embodiments, one or more of the guide rings 132 have a circumferential periphery and a plurality of small axially extending notches 148 disposed around the circumferential periphery in a spaced apart relationship. In other embodiments, one or more of the guide rings 132 have a series of large arcuate-shaped axially extending notches 150 (depicted as crosshatching in FIG. 6) to further facilitate the movement of the guide rings 132 and metal bellows 130 through fluid within the annular space 124 between the metal bellows 130 and the housing 114. The construction and use of metal bellows and guide rings in similar applications is disclosed in U.S. Pat. No. 9,657,556 entitled "Metal Bellows with Guide Rings," the disclosure of which is herein incorporated by reference.

Unlike the prior art use of guide rings and metal bellows, the inverted bellows assembly 120 is configured to place the guide rings 132 in contact with clean motor lubricant in the annular space 124 around the exterior 140 of the metal bellows 130. The clean motor lubricant significantly improves the low-friction interface between the housing 114 and the guide rings 132. This, in turn, improves the responsiveness and durability of the metal bellows 130 and reduces the risk of impingement between the guide rings 132 and the housing 114.

Turning back to FIG. 2, the inverted bellows assembly 120 is shown in a contracted state with the metal bellows 130 collapsed by the elevated volume of the hot motor lubricant in the annular space 124 between the exterior 140 of the metal bellows 130 and the interior of the housing 114. It will be noted that the standoff post 128 prevents the metal bellows 130 from collapsing beyond an extent that could damage the metal bellows 130. Contact between the top plate 138 and the standoff post cap 134 prevents the metal bellows 130 from being crushed by excess pressure within the housing 114. As the inverted bellows assembly 120 contracts, the wellbore fluid in the interior 138 of metal bellows 130 is pushed into the wellbore 104 through the exchange ports 126 and filter plugs. The discharge of fluid through the filter plugs may "backwash" entrapped solid particles into the wellbore 104. When the motor 110 cools, as depicted in FIG. 3, the motor lubricant reduces in volume to permit the expansion of the metal bellows 130 as pressure in the annular space 124 equalizes with the wellbore pressure communicated through the exchange ports 126.

Thus, the inverted bellows assembly 120 presents several advantages over similar fluid isolation mechanisms deployed in prior art volumetric compensators and seal sections. By directing the contaminated wellbore fluids into the interior 138 of the metal bellows 130, the clean motor lubricant can be used to improve the functionality of the guide rings 132 that support the metal bellows 130 within the housing 114. Additionally, unlike conventional bellows or bag seals that are configured to expand with an increasing volume of motor fluid, the inverted bellows assembly 120 and volumetric compensator 112 cooperate to safely compress the metal bellows 130 to a minimum position against the standoff post 128. Additionally, as the metal bellows 130 are compressed, the convolutions of the metal bellows 130 will touch and support each other to reduce the risk of buckling failure from an increased pressure gradient across the metal bellows 130.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

It will be appreciated by those skilled in the art that the teachings of the present invention can be applied to other systems without departing from the scope and spirit of the present invention. For example, it will be appreciated that the inverted bellows assembly 120 may find utility in other applications. Similarly, it may be desirable in certain applications to place the entire volumetric compensator 112 in different locations within the pumping system 100 where the accommodation of expanding and contracting motor lubricants is necessary.

What is claimed is:

1. A volumetric compensator for use in a pumping system deployed in a wellbore, wherein the pumping system has a fluid filled electric motor and a pump driven by the electric motor, the volumetric compensator comprising:

a head, wherein the head includes an inlet port configured to place the volumetric compensator in fluid communication with the motor;

a base, wherein the base includes an exchange port in fluid communication with the wellbore;

a housing extending between the head and the base; and an inverted bellows assembly contained within the housing, wherein the inverted bellows assembly comprises:

a metal bellows having an interior, an exterior, a proximal end and a distal end, wherein the proximal end is connected to the base, wherein the interior of the metal bellows is in fluid communication with the wellbore, and wherein an annular space is present between the exterior of the metal bellows and the housing;

a standoff post connected to the base, wherein the standoff post is contained within the interior of the metal bellows; and a guide ring connected to the exterior of the metal bellows, wherein the guide ring is configured to contact the housing of the volumetric compensator.

2. The volumetric compensator of claim 1, wherein the standoff post includes a plurality of vents that communicate wellbore fluid to the interior of the metal bellows.

3. The volumetric compensator of claim 1, wherein the inverted bellows assembly comprises a plurality of guide rings connected to the exterior of the metal bellows.

4. A pumping system deployed in a wellbore, the pumping system comprising:

a motor, wherein the motor contains a motor lubricant fluid;

a pump connected to a first end of the motor; and a volumetric compensator connected to a second end of the motor, wherein the volumetric compensator comprises:

a head attached to the motor;

a base comprising an exchange port; and a housing between the head and the base;

an inverted bellows assembly contained within the housing, wherein the inverted bellows assembly comprises:

a metal bellows that has an interior, an exterior, a proximal end and a distal end, and wherein the interior of the metal bellows is in fluid communication with the wellbore through the exchange port; and a standoff post within the metal bellows and connected to the base, wherein the standoff post comprises one or more vents, and wherein the exchange port extends through the base to the standoff post; and an annular space between the inverted bellows assembly and the housing, wherein the motor lubricant fluid extends into the annular space.

5. The pumping system of claim 4, wherein the motor is positioned between the pump and the volumetric compensator.

6. The pumping system of claim 4, wherein the inverted bellows assembly further comprises one or more guide rings attached to the exterior of the metal bellows.

7. The pumping system of claim 6, wherein at least one of the one or more guide rings has a circumferential periphery and a plurality of axially extending notches disposed around the circumferential periphery in a spaced apart relationship.

8. The pumping system of claim 4, wherein the head includes an inlet port that permits the exchange of lubricant fluids between the annular space and the motor.

9. The pumping system of claim 4, wherein the base further comprises a filter plug within the exchange port to limit the ingress of solid particles into the interior of the metal bellows.

10. The pumping system of claim 4, wherein a second exchange port extends directly through the base to the interior of the metal bellows.

11. A volumetric compensator for use in a pumping system deployed in a wellbore, wherein the pumping system has an electric motor with motor lubricating fluid and a pump driven by the electric motor, the volumetric compensator comprising:

a head, wherein the head includes an inlet port configured to place the volumetric compensator in fluid communication with the motor;

a base, wherein the base includes an exchange port in fluid communication with the wellbore;

a housing extending between the head and the base; and an inverted bellows assembly contained within the housing, wherein the inverted bellows assembly comprises:

a metal bellows;

an annular space between the metal bellows and the housing, wherein the annular space is filled with the motor lubricating fluid; and a plurality of guide rings connected to the exterior of the metal bellows, wherein each of the plurality of guide rings is configured to contact the housing of the volumetric compensator to prevent the metal bellows from directly contacting the housing.

12. The volumetric compensator of claim 11, wherein the metal bellows includes an interior, an exterior, a proximal end and a distal end, wherein the proximal end is connected to the base.

13. The volumetric compensator of claim 12, wherein the inverted bellows assembly further comprises a standoff post connected to the base, wherein the standoff post is contained within the interior of the metal bellows.

14. The volumetric compensator of claim 13, wherein the standoff post includes a plurality of vents that communicate wellbore fluid to the interior of the metal bellows.

15. The volumetric compensator of claim 12, wherein the interior of the metal bellows is in fluid communication with the wellbore.

16. The volumetric compensator of claim 11, wherein each of the plurality of guide rings comprises a plurality of notches that permit the movement of fluid through the guide ring as the guide ring moves through the annular space.

* * * * *